US012269147B1

(12) United States Patent
Wilson, Jr. et al.

(10) Patent No.: US 12,269,147 B1
(45) Date of Patent: Apr. 8, 2025

(54) ARTICULATED REACTION GEAR LOCKING FEATURE

(71) Applicant: Wilson Aerospace L.L.C., Boulder, CO (US)

(72) Inventors: David Wilson, Jr., Boulder, CO (US); David Simone Wilson, Boulder, CO (US)

( * ) Notice: Subject to any disclaimer, the term of this patent is extended or adjusted under 35 U.S.C. 154(b) by 522 days.

(21) Appl. No.: 17/375,732

(22) Filed: Jul. 14, 2021

Related U.S. Application Data

(60) Provisional application No. 63/054,414, filed on Jul. 21, 2020.

(51) Int. Cl.
*B25B 27/10* (2006.01)
*B25B 21/00* (2006.01)

(52) U.S. Cl.
CPC ............ *B25B 27/10* (2013.01); *B25B 21/002* (2013.01)

(58) Field of Classification Search
None
See application file for complete search history.

(56) References Cited

U.S. PATENT DOCUMENTS

| | | | | |
|---|---|---|---|---|
| 1,310,995 | A * | 7/1919 | Langford | E21B 19/161 81/DIG. 9 |
| 2,465,695 | A * | 3/1949 | Osborne | B25B 13/52 81/61 |
| 3,752,016 | A * | 8/1973 | Ballard | B25B 13/5016 81/57.17 |
| 2014/0238203 | A1* | 8/2014 | Spirer | B25B 23/0007 285/272 |
| 2014/0290444 | A1* | 10/2014 | Kundracik | E21B 19/161 81/90.4 |
| 2014/0290445 | A1* | 10/2014 | Tunningley | E21B 19/161 702/182 |
| 2015/0102600 | A1* | 4/2015 | Schooley | F16L 23/06 285/409 |
| 2015/0338007 | A1* | 11/2015 | Brimble | F16L 37/086 285/321 |

* cited by examiner

*Primary Examiner* — Bryan R Muller
*Assistant Examiner* — Dana Lee Poon
(74) *Attorney, Agent, or Firm* — Peter Joseph Borghetti

(57) ABSTRACT

Disclosed is a latching mechanism for a high-torque tool that allows a top semicircular segment to be connected and disconnected from a bottom semicircular segment, which allows a hex jaw (reaction gear) to engage a fluid fitting static nut for application of high torques. A pivoted latch has a curved blade, which is mounted closer to the center point of the hex jaw (reaction gear) than the latch pivot pin of the pivoted latch so that all of the forces are absorbed by the curved blade rather than the latch pivot pin.

7 Claims, 10 Drawing Sheets

ARTICULATED REACTION GEAR LOCKING FEATURE

CROSS-REFERENCE TO RELATED APPLICATION

This Non-Provisional patent application claims the benefit of the U.S. Provisional Patent Application No. 63/054,414, entitled "Articulated Reaction Gear Locking Feature," which was filed with the U.S. Patent & Trademark Office on Jul. 21, 2020, which is specifically incorporated herein by reference for all that it discloses and teaches.

BACKGROUND

Tools can be an important feature for designing and assembling complex devices. Specialized tools can be instrumental in the design of machines and equipment by allowing assembly and disassembly of parts in compact spaces or areas with limited access. As such, specialized tools can play a large role in design engineering.

SUMMARY

An embodiment of the present invention may therefore comprise a method of latching a first semicircular segment of a torque device to a second semicircular segment of the torque device to form a hex jaw comprising: pivoting the first semicircular segment with respect to the second semicircular device with an axle; securing a pivoted latch to the first semicircular segment using a latch pivot pin that allows the pivoted latch to pivot with respect to the first semicircular segment; engaging a curved blade on the pivoted latch in a curved slot in the second semicircular segment so that the curved blade is located closer to a center point of the hex jaw than the latch pivot pin so that the curved blade and the curved slot absorb circumferential shear forces between the first semicircular segment and the second semicircular segment rather than the latch pivot pin.

An embodiment of the present invention may further comprise a latching device for a hex jaw in a torque device comprising: a first semicircular segment of the hex jaw; a second semicircular segment of the hex jaw; a pivot axle that allows the first semicircular segment to pivot with respect to the second semicircular segment so that the first semicircular segment and the second semicircular segment can engage a first nut; a pivoted latch; a latch pivot pin that pivotally attaches the pivoted latch to the first semicircular segment; a curved blade on the pivoted latch; a curved slot formed in the second semicircular segment that is engaged by the curved blade so that the curved blade is located closer to a center point of the hex jaw than the latch pivot pin so that the curved blade and the curved slot absorb circumferential shear forces rather than the latch pivot pin.

DETAILED DESCRIPTION OF THE EMBODIMENTS

Figure 1:
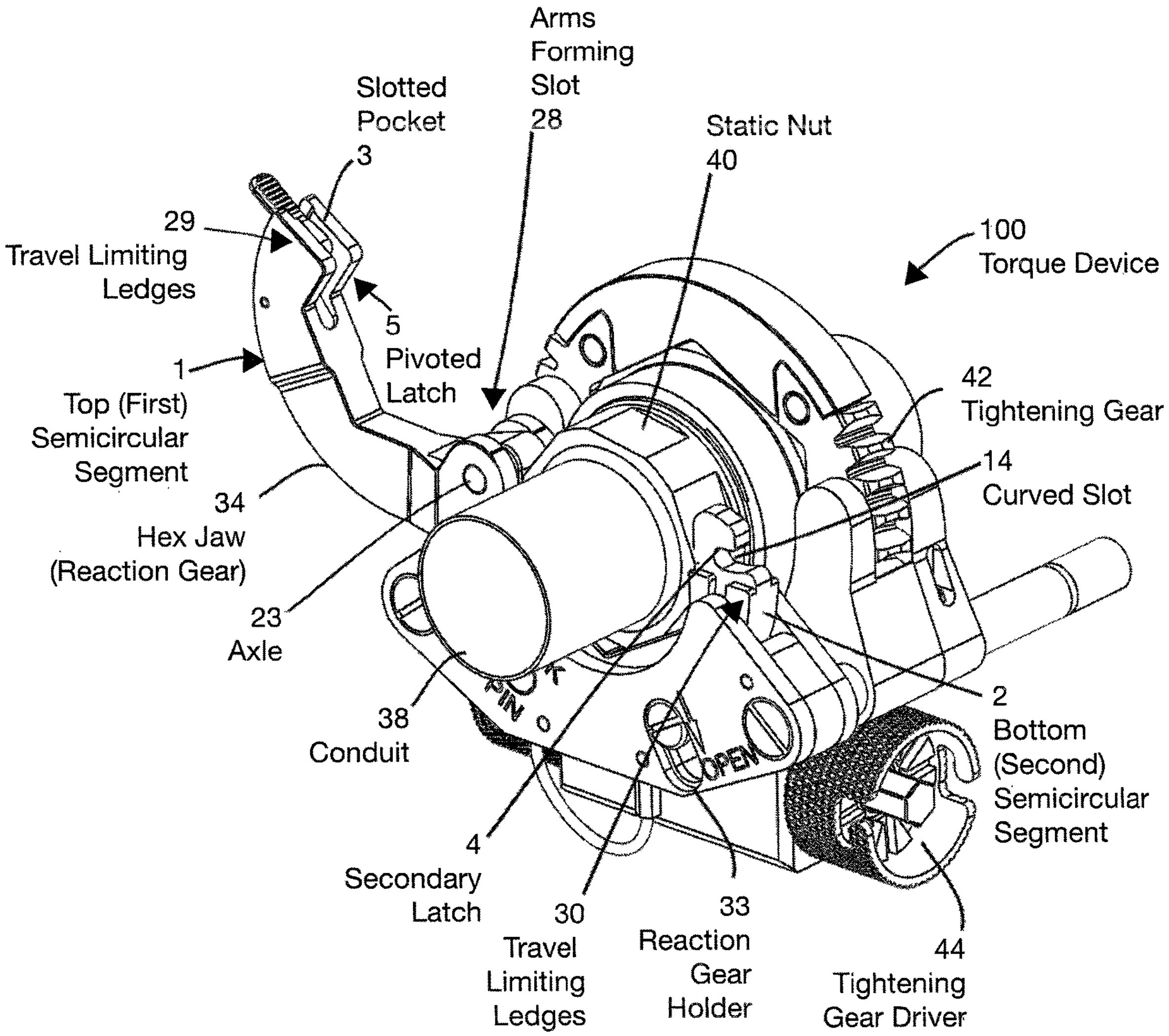
FIG. 1 is an isometric view of an embodiment of a torque device having a pivoted latch in an open position.

FIG. 1 is an isometric view of a torque device 100 that is used for assembling and disassembling fluid fittings on a fluid conduit 38. Fluid conduit 38 has a fluid fitting static nut 40 that is sealed to the fluid conduit 38. The torque device 100 has a top (first) semicircular section 1 that is illustrated in an open position. The top (first) semicircular segment 1 pivots on a pivot axle 23 and engages a bottom (second) semicircular segment 2, which forms a hex jaw (reaction gear) 34 (FIG. 3) that engages the fluid fitting static nut 40. FIG. 1 illustrates the use of the torque device 100 in conjunction with a fluid fitting for a conduit 38. However, the torque device 100 provides a compact tool for tightening and loosening nuts for any device and is useful for creating high torques on nuts located in confined spaces. The top (first) semicircular segment 1 has a slotted pocket 3 that engages a curved slot 14 on secondary latch 4. The top (first) semicircular segment 1 has a travel limiting ledge 29, which abuts against a travel limiting ledge 30, on the bottom (second) semicircular segment 2. The top (first) semicircular segment 1 fits within the arms forming slot 28 and pivots around axle 23.

Figure 3:
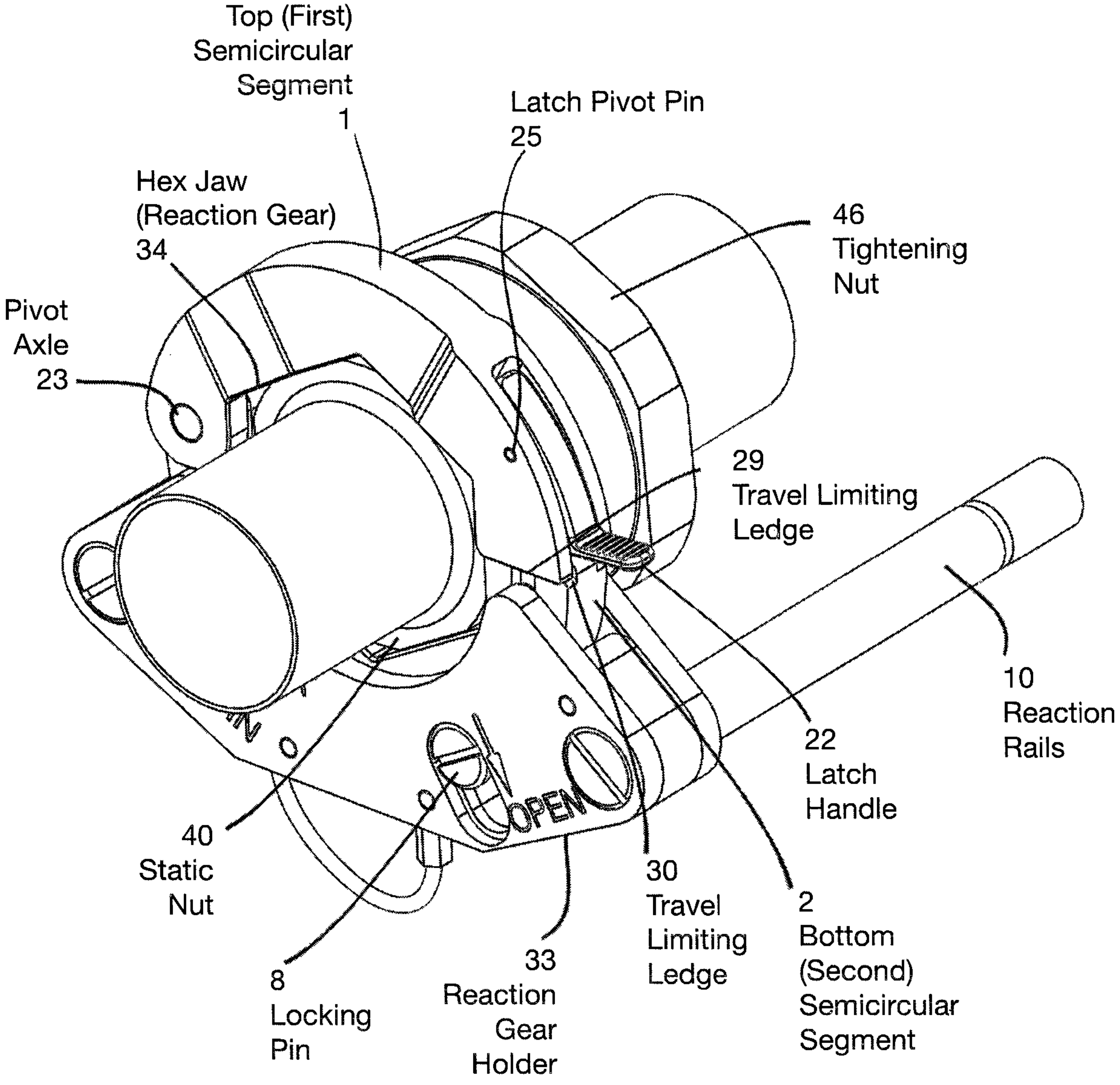
FIG. 3 is an isometric view of the torque device of FIG. 1 illustrating a hex jaw (reaction gear) that is engaging a stationary fluid fitting.

As also shown in FIG. 1, the torque device 100 has two sections that operate independently. The first section comprises the top (first) semicircular segment 1, which can be latched to the bottom (second) semicircular segment 2, which in turn is connected to the reaction gear holder 33. The tightening gear 42 is operated by the tightening gear driver 44 and rotates independently of the top (first) semicircular segment 1 and the bottom (second) semicircular segment 2. In this manner, the top (first) semicircular segment 1 and bottom (second) semicircular segment 2 can be latched together and engage the fluid fitting static nut 40, while the tightening gear 42 can be operated by tightening gear driver 44 to engage the fluid fitting tightening nut 46 (FIG. 3). In this manner, the fluid fitting can be assembled or disassembled using the torque device 100.

Figure 2:
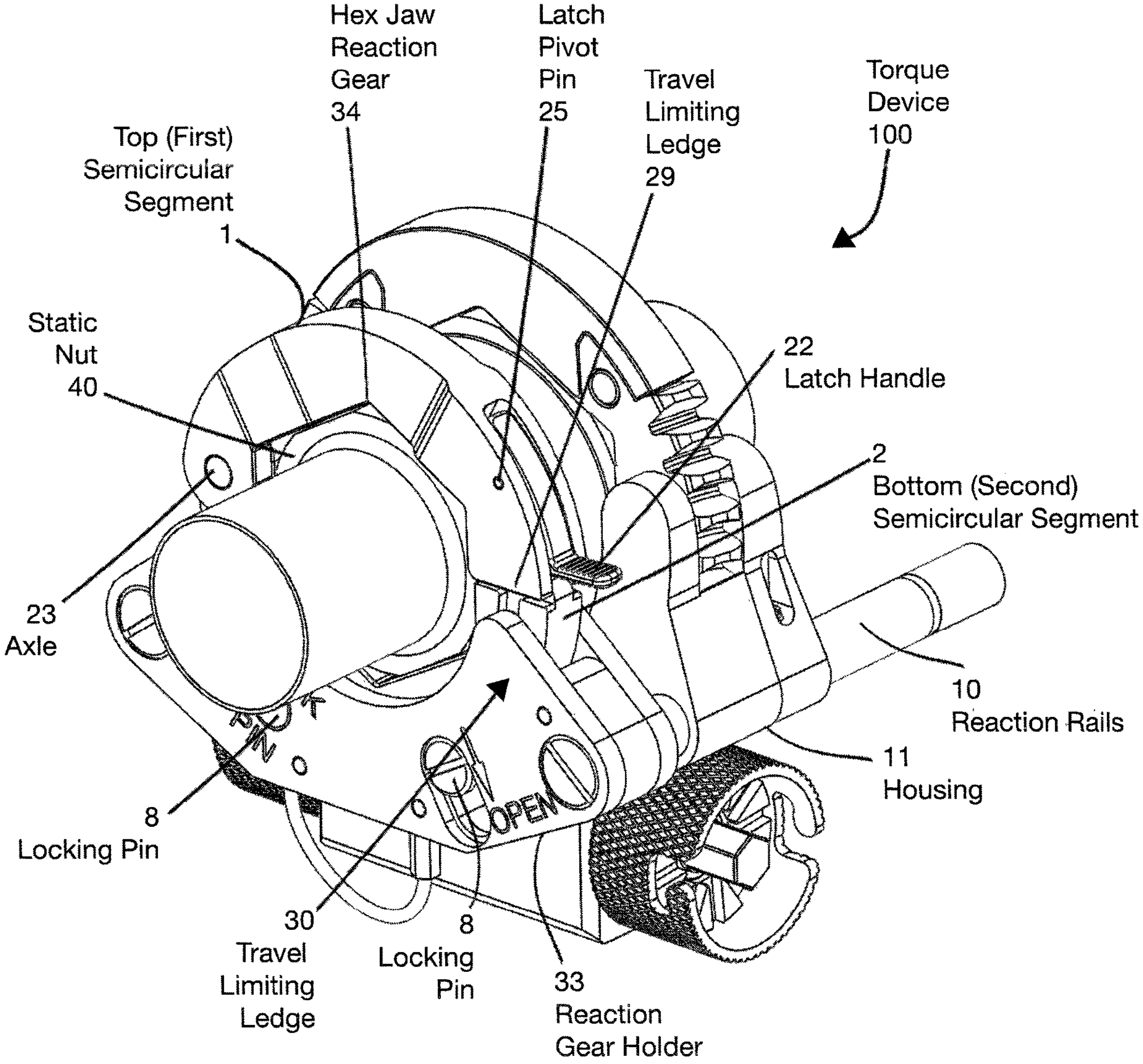
FIG. 2 is an isometric view of the embodiment of FIG. 1 with the pivoted latch in a closed position.

FIG. 2 is an isometric view of the torque device 100 with the top (first) semicircular segment 1 in a closed position and latched to the bottom (second) semicircular segment 2. As illustrated in FIG. 2, the top (first) semicircular segment 1 and the bottom (second) semicircular segment 2, in the closed position, form a hex jaw (reaction gear) 34 that engages a fluid fitting static nut 40. Again, the top (first) semicircular segment 1 rotates about the pivot axle 23 to the closed position illustrated in FIG. 2. A pivoted latch 5 (FIG. 7) includes a latch pivot pin 25 on which the pivoted latch 5 rotates. Pivoted latch 5 has a latch handle 22 for manual operation of the pivoted latch 5. Again, the top (first) semicircular segment 1 has travel limiting ledge 29 that abuts against the travel limiting ledge 30 of the bottom (second) semicircular segment 2. The bottom (second) semicircular segment 2 is housed and captured in a reaction gear holder 33. The reaction gear holder 33 has two locking pins 8 that engage the reaction gear holder 33 with the bottom (second) semicircular section 2 by engaging notches 9 (FIG. 6) in the hex jaw (reaction gear) 34. The reaction gear holder 33 is coupled to the fluid fitting torque device housing 11 via reaction rails 10. Reaction rails 10 allow the fluid fitting torque device housing 11 to slide along the reaction rails 10 to accommodate different spacings between the fluid fitting static nut 40 and the fluid fitting tightening nut 46 (FIG. 3). In this manner, the fluid fitting torque device housing 11 and the reaction gear holder 33 are coupled together to allow tightening and loosening of the fluid fittings.

FIG. 3 is an isometric view of the hex jaw (reaction gear) 34 that surrounds the fluid fitting static nut 40. FIG. 3 also illustrates pivot axle 23 of the top (first) semicircular segment 1. Latch pivot pin 25, on which the pivoted latch 5 (FIG. 9) is mounted, is also illustrated in FIG. 3. FIG. 3 also illustrates the fluid fitting tightening nut 46, latch handle 22 and travel limiting ledge 30 that comprises the top portion of the bottom (second) semicircular segment 2. Travel limiting ledge 30 intersects with travel limiting ledge 29 of the top (first) semicircular segment 1. Reaction gear holder 33 secures the reaction rails 10. Locking pin 8 is also secured in the reaction gear holder 33.

Figure 4:
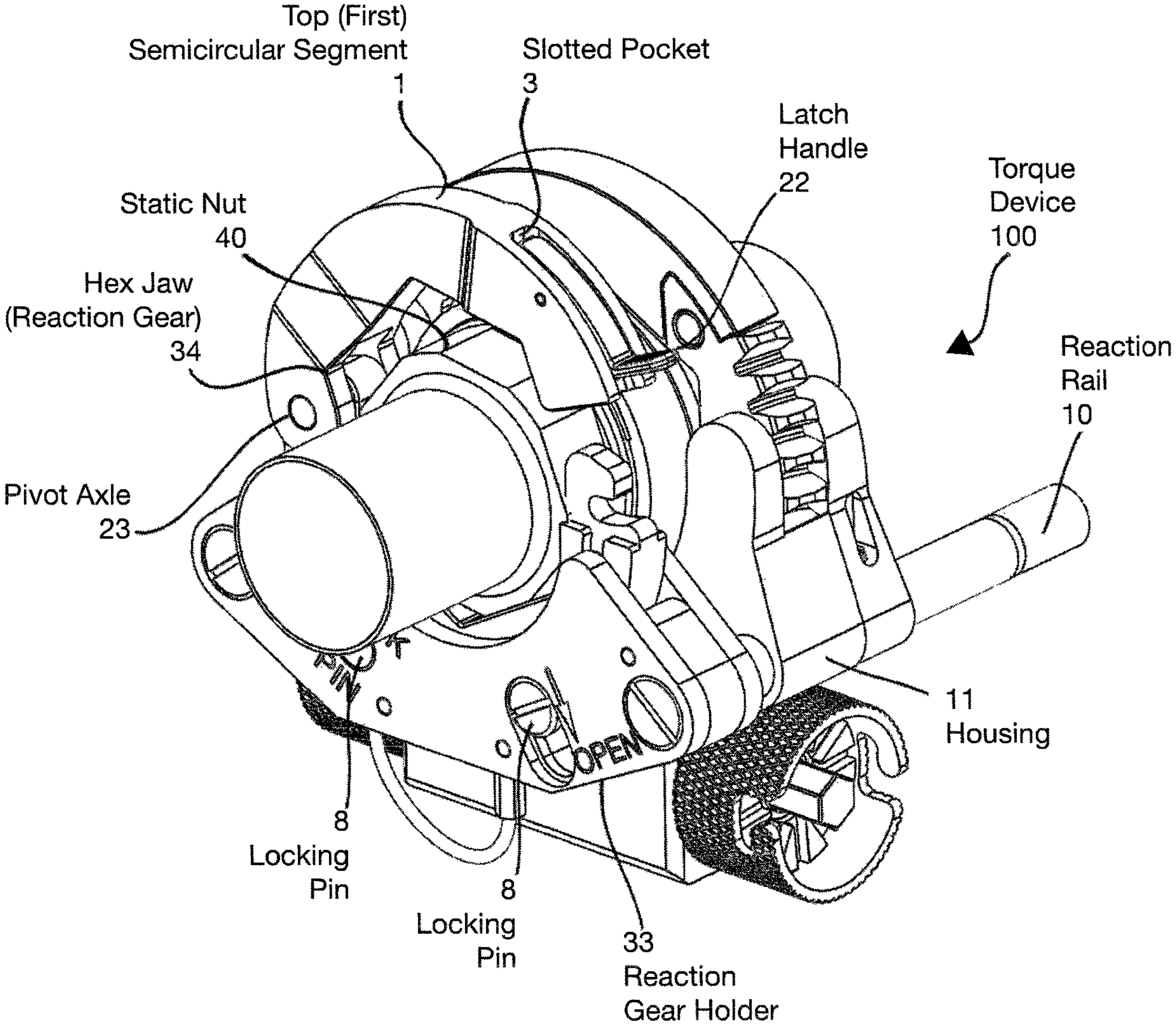
FIG. 4 is an isometric view of the torque device of FIG. 1 with a pivoted latch in a partially open position.

FIG. 4 is an isometric view of the torque device 100 with the top (first) semicircular segment 1 in a partially open position. As illustrated in FIG. 4, the top (first) semicircular segment 1 forms the top portion of the hex jaw (reaction gear) 34. The hex jaw (reaction gear) 34 is designed to engage the fluid fitting static nut 40. Locking pins 8 lock the reaction gear holder 33 to the bottom (second) semicircular segment 2 (FIG. 2). Reaction rails 10 couple the reaction gear holder 33 to the fluid fitting torque device housing 11. The top (first) semicircular segment 1 pivots on pivot axle 23. A slotted pocket 3 allows the pivoted latch 5 (FIG. 7) to pivot. Latch handle 22 allows for manual operation of the pivoted latch 5 (FIG. 7).

Figure 5:
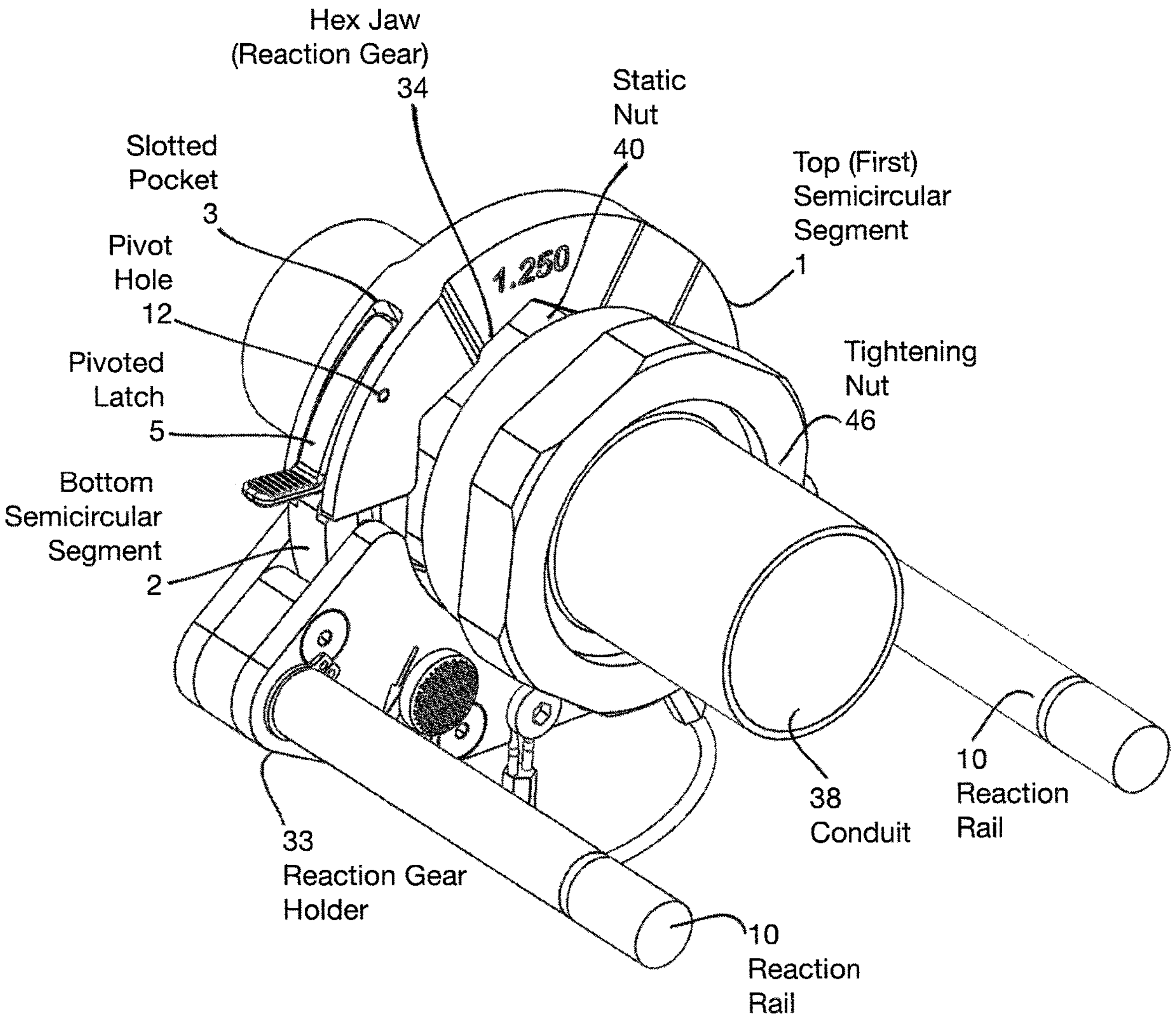
FIG. 5 is an isometric view of the torque device of FIG. 1 with the tightening gear removed.

FIG. 5 is a back isometric view of the hex jaw (reaction gear) 34 and a fluid fitting, including fluid fitting tightening nut 46 and fluid conduit 38. Fluid fitting tightening nut 46 rotates with respect to the fluid conduit 38 and tightens the fluid conduit 38 to the fluid fitting. Hex jaw (reaction gear) 34 engages the fluid fitting static nut 40. The fluid fitting tightening nut 46 is rotated to a predetermined torque to prevent leaking in the fluid conduit 38. FIG. 5 also illustrates the reaction rails 10 and the reaction gear holder 33 upon which the reaction rails 10 are mounted. Slotted pocket 3 allows movement of the pivoted latch 5 with respect to the top (first) semicircular segment 1. FIG. 5 also illustrates pivot hole 12 in which the pivoted latch 5 is mounted in the bottom (second) semicircular segment 2.

Figure 6:
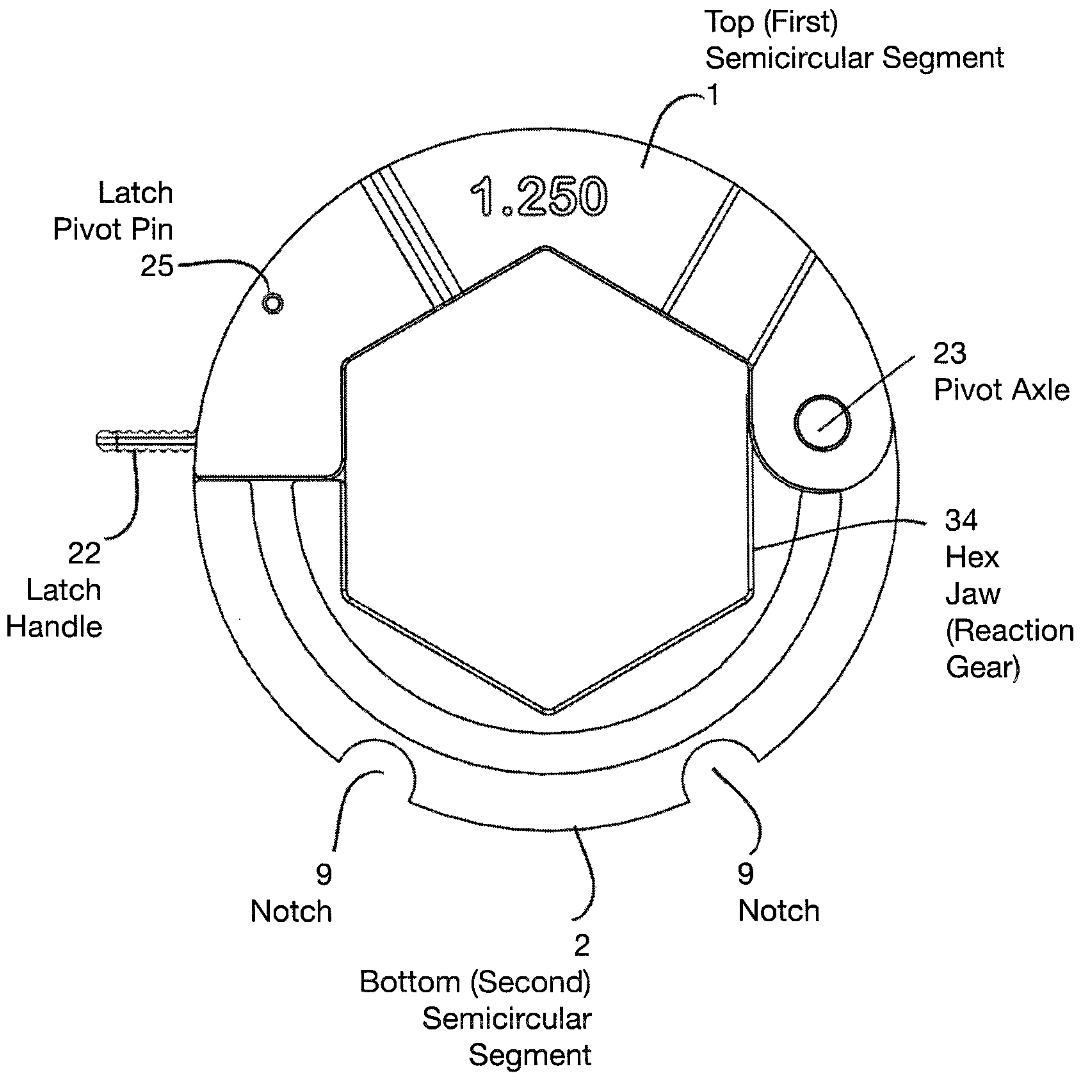
FIG. 6 is a plan view of the hex jaw (reaction gear) with the top (first) semicircular segment in a closed position.

FIG. 6 is a plan view of the top (first) semicircular segment 1 and bottom (second) semicircular segment 2, which form the hex jaw (reaction gear) 34. The bottom (second) semicircular segment 2 has notches 9 that engage the locking pins 8 (FIG. 2). Latch pivot pin 25 is mounted in the top (first) semicircular segment 1 and allows the pivoted latch 5 (FIG. 7) to pivot. Latch handle 22 provides for manual operation of the pivoted latch 5 (FIG. 7). Pivot axle 23 allows the top (first) semicircular segment 1 to rotate with respect to the bottom (second) semicircular segment 2.

Figure 7:
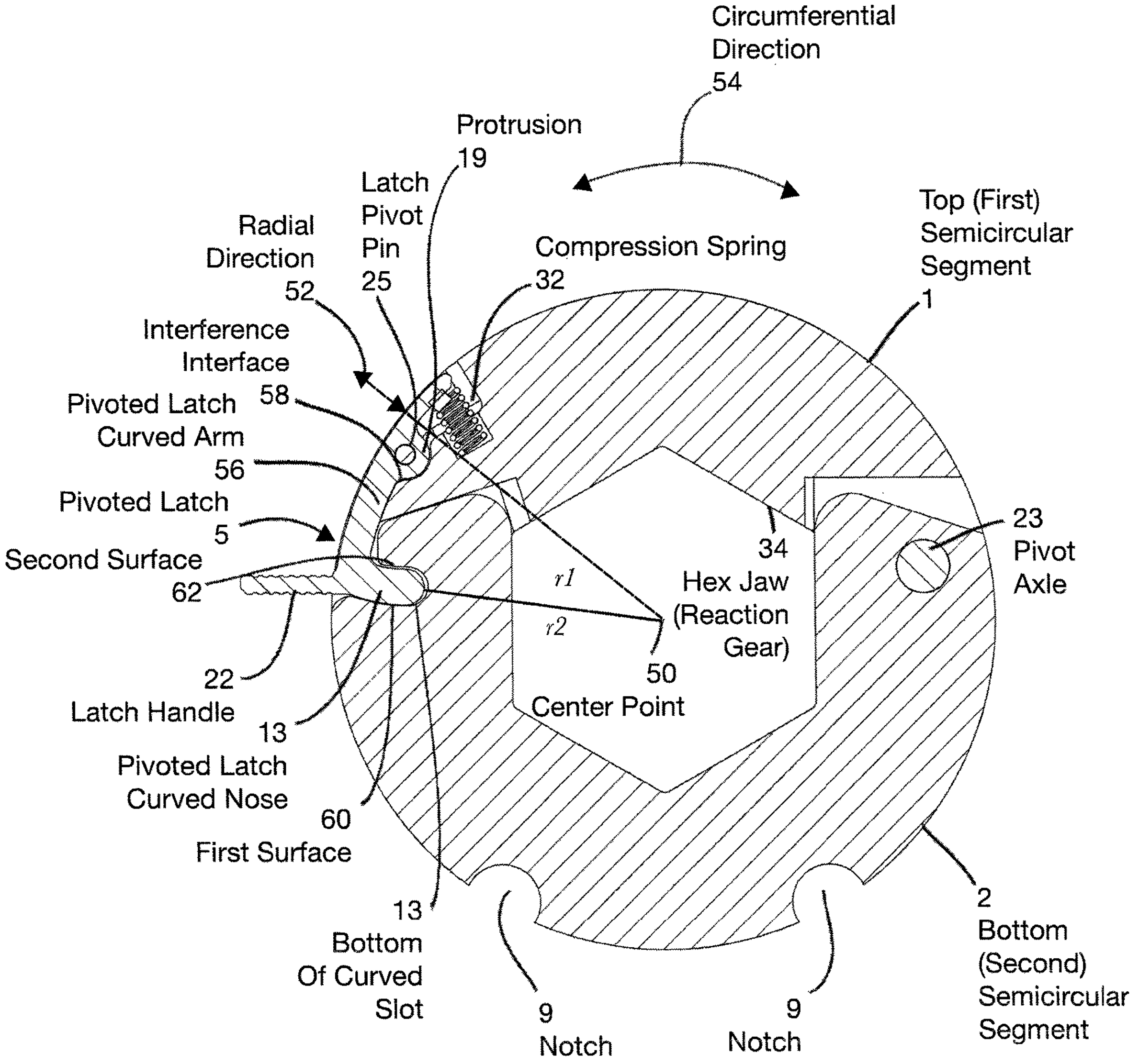
FIG. 7 is a sectional view of the hex jaw (reaction gear) illustrating a latch in a closed position.
Figure 9:
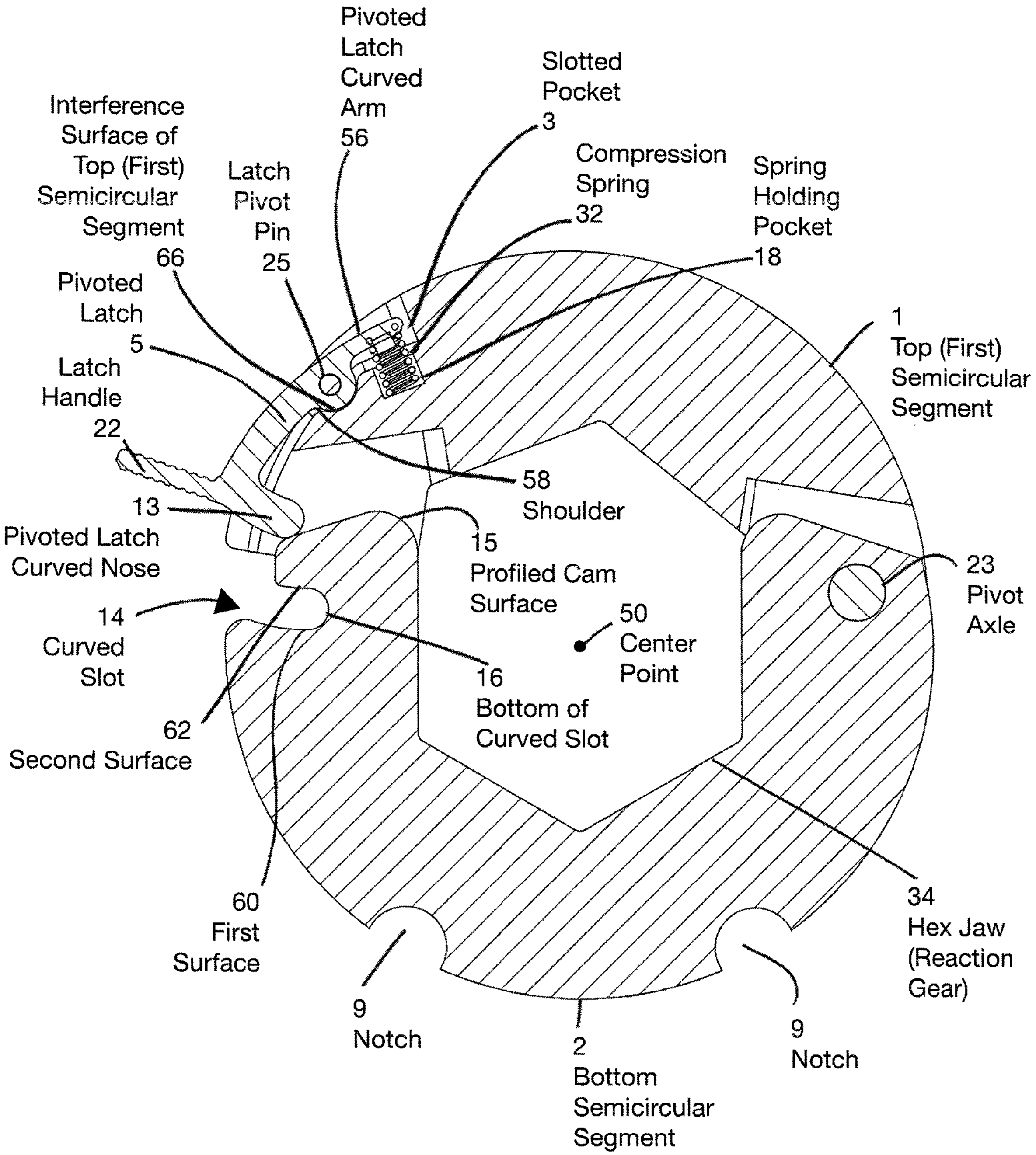
FIG. 9 is a cut-away view of the hex jaw (reaction gear) illustrating the pivoted latch in an open position.

FIG. 7 is a cross-sectional view of the top (first) semicircular segment 1 and the bottom (second) semicircular segment 2, which form the hex jaw (reaction gear) 34. As shown in FIG. 7, the top (first) semicircular segment 1 has a pivoted latch 5 connected via latch pivot pin 25 on the pivoted latch curved arm 56. Of course, the pivoted latch 5 can be connected to the bottom (second) semicircular segment 2 and the top (first) semicircular segment 1 can have a curved slot 14 for engagement by the pivoted latch 5. A compression spring 32 causes the pivoted latch 5 to be biased in an inward radial direction 52 towards center point 50. Latch handle 22 allows manual movement of the pivoted latch 5. A curved slot 14 (FIG. 9) in the bottom (second) semicircular segment 2 engages a pivoted latch curved nose 13 of pivoted latch 5. The bottom (second) semicircular segment 2 surrounds the pivoted latch curved nose 13 on at least two sides, i.e., a first surface 60 and a second surface 62. The shape of the pivoted latch curved nose 13 matches the shape of the curved slot 14 (FIG. 9) so that the entire surface of the pivoted latch curved nose 13 is surrounded by the first surface 60 and the second surface 62 as well as all other surfaces of the bottom (second) semicircular segment 2 of the curved slot 14 (FIG. 9). (This is illustrated in FIG. 7.) The bottom portion 16 of curved slot 14 is located a distance ($r_2$) from the center point 50 of the hex jaw (reaction gear) 34. The latch pivot pin 25 is located a distance ($r_1$) from the center point 50, where ($r_1$) is greater than ($r_2$). Notches 9 secure the hex jaw (reaction gear) 34 in the torque device 100. As long as ($r_1$) is greater than ($r_2$), the shear forces on the latch pivot pin 25 are reduced or eliminated in the embodiment illustrated in FIG. 7. The pivoted latch 5, includes a pivoted latch curved nose 13, as described above, a latch handle 22, a pivoted latch curved arm 56, and a protrusion 19 that is located around the latch pivot pin 25. The top (first) semicircular segment 1 includes a shoulder 58 that interferes with the protrusion 19 (FIG. 7) to create an interference interface 58. The interference interface 58 resists movement of the top (first) semicircular segment 1 in a clockwise circumferential direction 54. First surface 60 and second surface 62 generate reaction forces in response to forces created by the pivoted latch curved nose 13 whenever the pivoted latch curved arm 56 is moved in an outward radial direction 52. The shear force that may exist between the top (first) semicircular segment 1 and the bottom (second) semicircular segment 2 are absorbed by first surface 60 and second surface 62 in response to forces from the pivoted latch curved nose 13. In fact, if the latch pivot pin 25 were to break, it would not affect the latching mechanism provided by pivoted latch 5. In other words, forces generated by the pivoted latch curved nose 13, include all or most of the shear forces that exist circumferentially around the hex jaw (reaction gear) 34, are absorbed by the first surface 60 and second surface 62 so that the latch pivot pin 25 maintains the latched orientation of the top (first) semicircular segment 1 and the bottom (second) semicircular segment 2 of the hex jaw (reaction gear) 34. So, even if the latch pivot pin 25 were to break, the pivoted latch 5 would remain in place. The interference interface 58 resists movement of the top (first) semicircular segment 1 with respect to the bottom (second) semicircular segment 2 preventing separation of the semicircular segments and opening of the pivoted latch 5.

Figure 8:
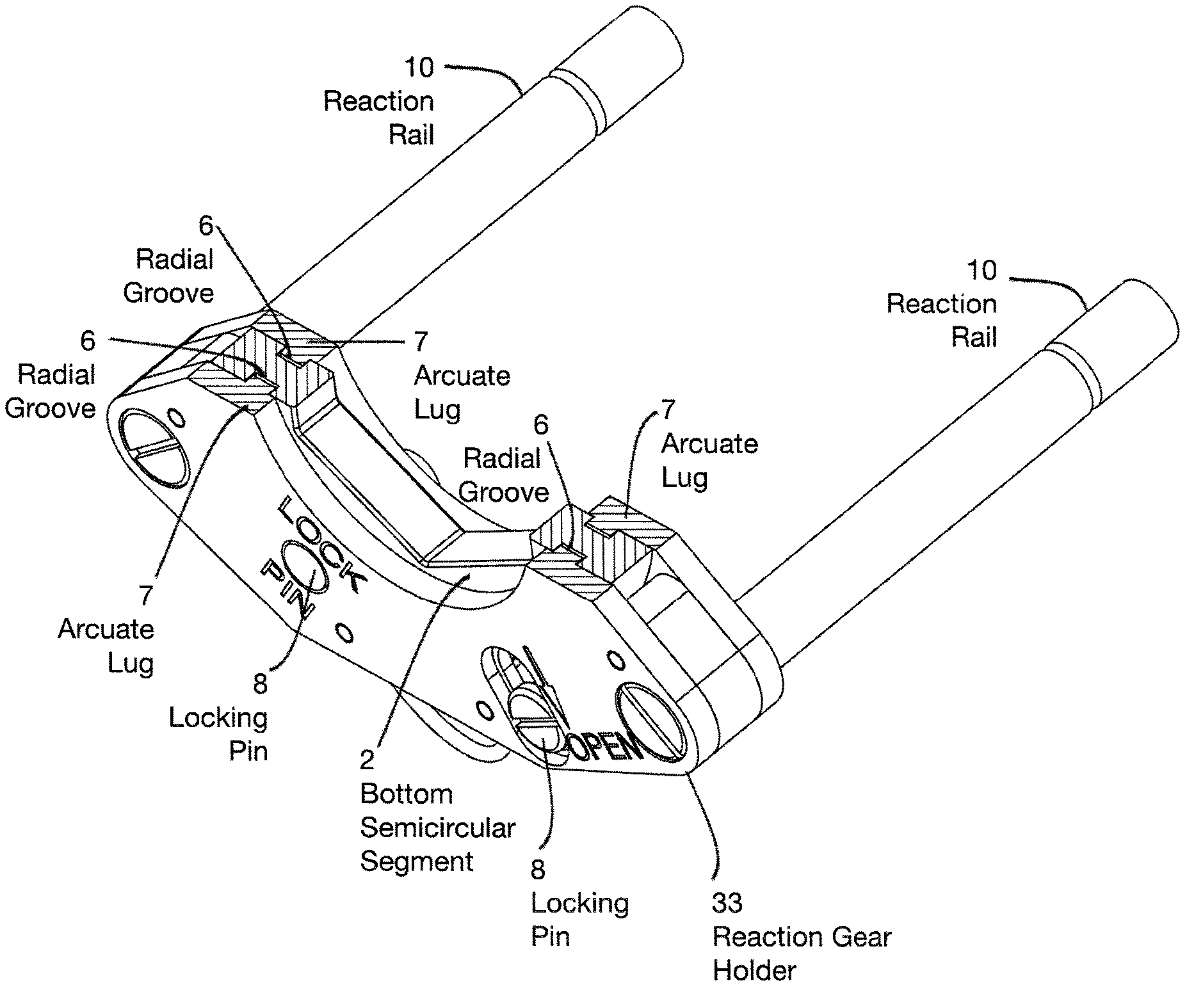
FIG. 8 is an isometric view of the bottom (second) semicircular segment and reaction rails.

FIG. 8 is an isometric view of the reaction gear holder 33 and reaction rails 10. Locking pins 8 engage the hex jaw (reaction gear) 34 (FIG. 7) by way of notches 9 (FIG. 7), which prevents the hex jaw (reaction gear) 34 from moving with respect to the reaction gear holder 33. Arcuate lugs 7 allow the hex jaw (reaction gear) 34 to rotate with respect to the reaction gear holder 33 while radial grooves 6 allow movement of the hex jaw (reaction gear) 34 with respect to the reaction gear holder 33.

FIG. 9 is a cross-sectional view of the top (first) semicircular segment 1 and bottom (second) semicircular segment 2 that form the hex jaw (reaction gear) 34. As illustrated in FIG. 9, the pivoted latch 5 is an upward disengaged position. This may occur by the latch handle 22 being forced upwardly against the force of the compression spring 32, which is mounted in the spring holding pocket 18. The slotted pocket 3 allows movement of the pivoted latch 5 in the top (first) semicircular segment 1. The pivoted latch curved nose 13 of the pivoted latch 5 fits in the curved slot 14 and travels to the bottom of the curved slot 16. All of the circumferential shear forces are absorbed in the curved slot 14. As the top first semicircular segment 1 is rotated in a counterclockwise direction, the pivoted latch curved nose 13 rides along the profiled cam surface 15 and slowly opens in a manner that compresses the compression spring 32 in the spring holding pocket 18. As the top (first) semicircular segment 1 is further rotated in a counterclockwise direction, the pivoted latch curved nose 13 slides into the curved slot 14 automatically as a result of the force on the pivoted latch curved arm 56 by the compression spring 32. To open the latch, the latch handle 22 can be grasped and pulled from the curved slot 14 and the top (first) semicircular segment 1 can be rotated in a clockwise direction. FIG. 9 illustrates the first surface 60 and the second surface 62 that create reaction forces on the pivoted latch curved nose 13 when circumferential or radial forces are applied to the pivoted latch curved arm 56. Interference surface 66 on the top (first) semicircular segment 1 intersects with the protrusion 19, illustrated in FIG. 7, to create the interference interface 58, illustrated in FIG. 7. Notches 9 secure the hex jaw (reaction gear) 34 to the reaction gear holder 33 (FIG. 8). Pivot axle 23 allows the top (first) semicircular segment 1 to pivot with respect to the bottom (second) semicircular segment 2.

Figure 10:
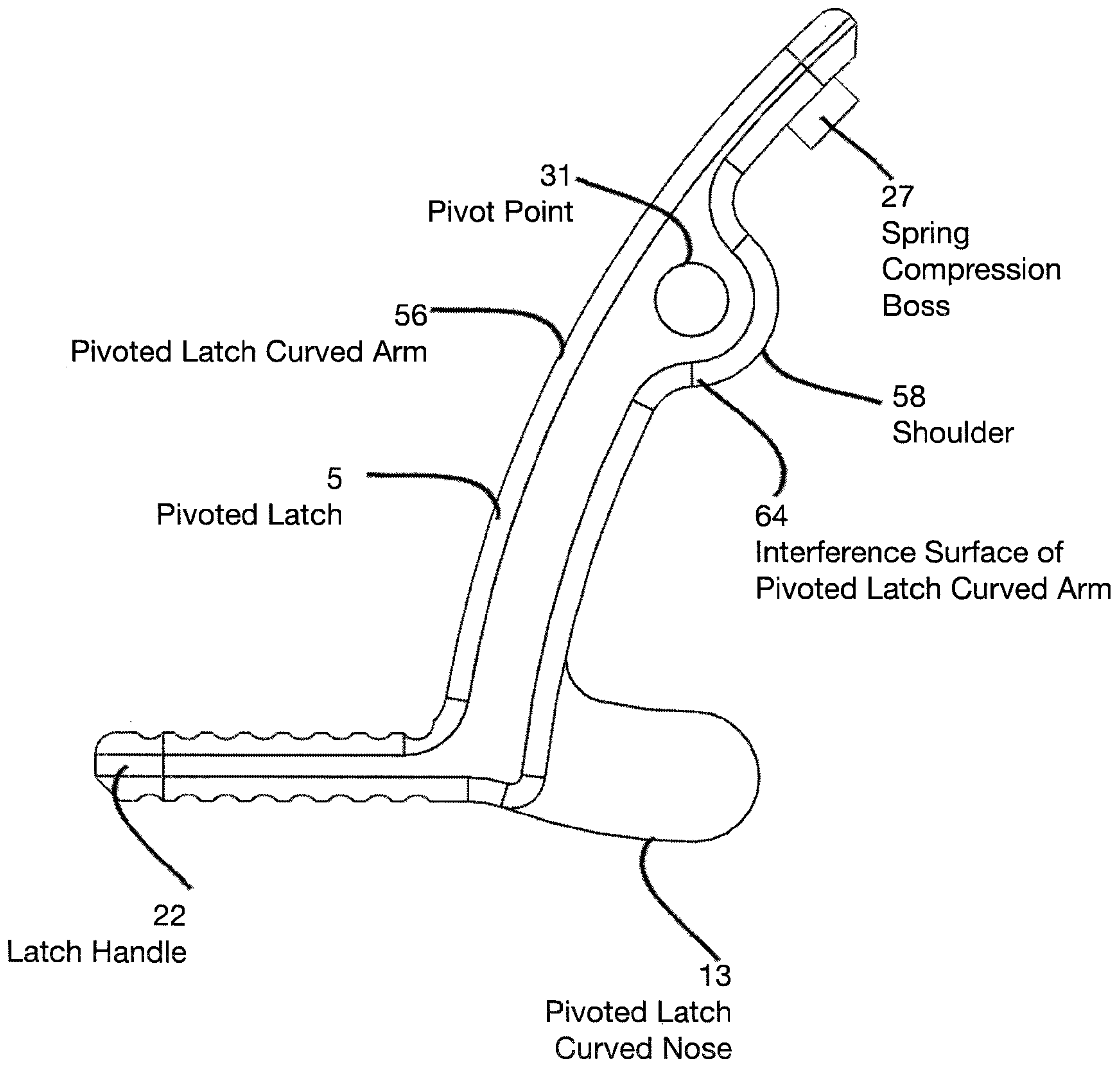
FIG. 10 is a plan view of the pivoted latch.

FIG. 10 is a plan view of the pivoted latch 5. The pivoted latch 5 has a pivot point 31, which allows the pivoted latch 5 to pivot on the top (first) semicircular segment 1 (FIG. 9). Pivoted latch 5 also includes a latch handle 22, which allows for manual operation of the pivoted latch 5. Spring compression boss 27 engages the compression spring 32 (FIG. 9). The pivoted latch 5 includes a pivoted latch curved nose 13 that fits within the curved slot 14 (FIG. 9) of the bottom (second) semicircular segment 2 (FIG. 9).

Consequently, the present invention provides a unique way of allowing a torque device to engage the compression nuts of a fluid fitting, or other nuts, for application of high torques. The pivoted latch curved nose 13 of the pivoted latch 5 absorbs all or most of the circumferential forces, including the shearing forces, that are created between the top (first) semicircular segment 1 and the bottom (second) semicircular segment 2.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed:

1. A latching apparatus for a polygon article comprising:
- a latch having a pivoted latched curved nose and a protrusion;
- a first segment comprising:
  - a substantially non-circular inner surface,
  - a recess to receive the protrusion, and
  - a pivot hole sized to receive a pivot axle;
- a second segment comprising:
  - a radial groove to create an I-shaped cross section,
  - Two semi-circular notches,
  - a substantially non-circular inner surface, a slot at a first end of the second segment to receive the pivoted latched curved nose, and
  - a pivot hole at a second end of the second segment, wherein the pivot hole is sized to receive the pivot axle, wherein the pivot axle pivotally connect: the first segment and the second segment thereto, and wherein the first segment substantially non-circular inner surface and the second segment substantially non-circular inner surface form a polygon to engage with the polygon article when in a closed position; and
  - wherein the first segment and the second segment are removably affixed thereto when the pivoted latched curved nose is received into the second segment slot and the protrusion is received into the first segment recess when in the closed position;
- a reaction gear holder comprising:
  - locking pins to optionally operatively engage with said notches to hold the second segment to the reaction gear holder;
  - arcuate lugs to optionally operatively engage with the radial groove of the second segments to allow the first and second segments to rotate with respect to the reaction gear holder; and
  - wherein the reaction gear holder is slidable along to two reaction rails and only engageable with the second segment.

2. The latching apparatus of claim 1 wherein the first segment inner surface is a non-circular inner surface and the second segment inner surface is a non-circular inner surface.

3. The latching apparatus of claim 1 wherein the protrusion is semi-circular.

4. The latching apparatus of claim 1 wherein:
- the pivoted latched curved nose is positioned at a first end of the first segment; and
- the protrusion positioned at a second end of the first segment.

5. The latching apparatus of claim 1 wherein:
- the recess is positioned at a first end of the first segment to receive the protrusion; and
- the pivot hole is positioned at a second end of the first segment sized to receive a pivot axle.

6. The latching apparatus of claim 1 wherein:
- the first segment is semicircular; and
- the second segment is semicircular.

7. A method for latching a first segment to a second segment together to form a polygon inner surface for engaging a polygon article comprising:
- providing the first segment with a recess at a first end of the first segment and a pivot axle hole at a second end of the first segment;
- providing the second segment with a radial groove to create an I-shaped cross section, two semi-circular notches, a radial groove to create an I-shaped cross section, Two semi-circular notches, a slot to a first end of the second segment and a pivot axle hole at a second end of the second segment;
- providing a latch with a curved nose at a first end of the latch sized to be received into the slot of the second segment and a protrusion at a second end of the latch sized to be received into the recess of the first segment;

inserting a pivot axle into the first segment pivot axle hole and the second segment pivot axle hole, whereby the first and second segments are pivotally connected;

pivoting the first segment with respect to the second segment to form a closed position, whereby a non-circular inner surface of the first segment and a non-circular inner surface of the second segment form a polygon; and inserting the curved nose of the latch into the slot of the second segment and the protrusion of the latch into the recess of the first segment, whereby the first segment and second segment are locked together;

inserting the second segment into a reaction gear holder provided with locking pins to optionally operatively engage with said notches to prevent the latching apparatus from moving with respect to the gear holder, arcuate lugs to optionally operatively engage with the radial groove of the second segments to allow the first and second segments to rotate with respect to the gear holder, and wherein the reaction gear holder is slidable along to two reaction rails and only engageable with the second segment.

* * * * *